United States Patent [19]

Goto et al.

[11] Patent Number: 4,492,906
[45] Date of Patent: Jan. 8, 1985

[54] ELECTRIC MOTOR

[75] Inventors: Tadahiko Goto, Nakama; Kiyoshi Oniki; Satoshi Murakami, both of Kitakyushu; Mitsunori Yokooji, Munakata; Norio Andou; Norio Shimojyo, both of Kitakyushu, all of Japan

[73] Assignee: Yaskawa Electric Mfg. Co., Ltd., Fukuoka, Japan

[21] Appl. No.: 309,734

[22] Filed: Oct. 8, 1981

[30] Foreign Application Priority Data

Oct. 15, 1980 [JP] Japan .............................. 55-145364
Oct. 29, 1980 [JP] Japan .......................... 55-156071[U]
Apr. 30, 1981 [JP] Japan ................................ 56-65372
Apr. 30, 1981 [JP] Japan ................................ 56-65373
Aug. 14, 1981 [JP] Japan .............................. 56-127897

[51] Int. Cl.³ .............................................. G01L 3/14
[52] U.S. Cl. .................................... 318/488; 318/475; 310/68 B; 73/862.34
[58] Field of Search .............. 267/156, 155; 310/68 B; 73/862.34; 318/488, 491, 432, 475

[56] References Cited

U.S. PATENT DOCUMENTS 2,763,797  9/1956  Dean .................................. 318/475
2,901,076  8/1959  Dean .................................. 318/475
2,945,925  7/1960  Gessell .............................. 318/475
4,364,277 12/1982  Randell ........................... 73/862.34

FOREIGN PATENT DOCUMENTS 133637 10/1981  Japan .............................. 73/862.34

Primary Examiner—George H. Miller, Jr.
Assistant Examiner—A. Evans
Attorney, Agent, or Firm—Jordan and Hamburg

[57] ABSTRACT

This invention discloses an electric motor comprising a stator, a rotor disposed concentrically within the stator, a drive shaft rotatably supporting the rotor with a circular gap between the stator and rotor and an output shaft connected to the drive shaft and sharing the same rotating axis with the drive shaft, wherein the improvement is characterized in that the electric motor further includes a resilient connecting member which connects the drive shaft and the output shaft and means which detects the torsion of the resilient connecting member produced during the transmission of the torque from the rotor to the output shaft and measures the transmission torque from the detected torsion.

25 Claims, 14 Drawing Figures

ELECTRIC MOTOR

BACKGROUND OF INVENTION

This invention relates to an electric motor which can constantly measure the transmission torque which is produced during the transmission of torque from the stator to the load.

Figure 1:
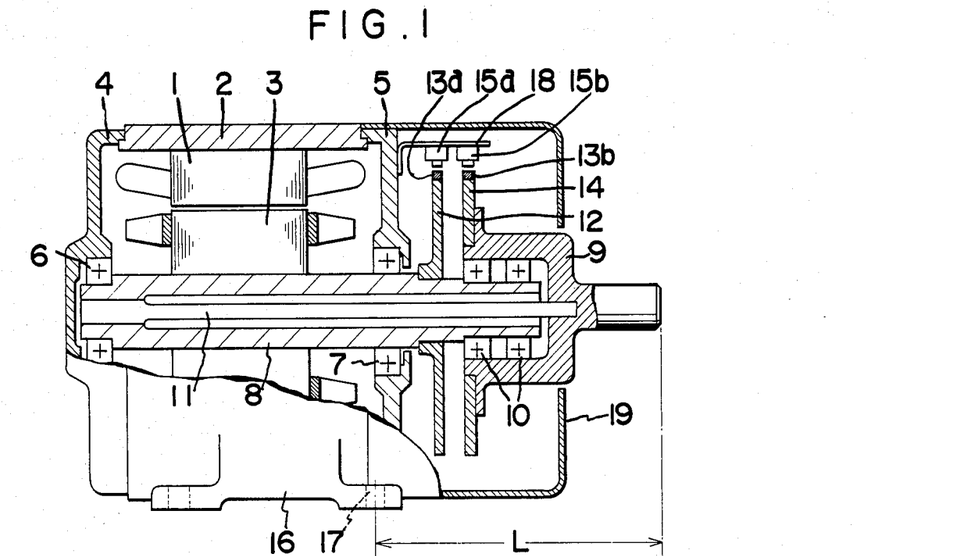
FIG. 1 is a side view with a part broken away of a conventional electric motor.

In FIG. 1, a conventional-type of the above-mentioned electric motor is shown.

In the drawing, numeral 1 indicates an annular stator and such stator is fixedly secured to a motor frame 2. Numeral 3 indicates a rotor and such rotor 3 is fixedly secured to a first hollow shaft 8 which has both ends thereof rotatably supported in brackets 4, 5 by means of bearings 6 and 7. Numeral 9 is an output shaft which is rotatably mounted on the output-end of the first hollow shaft 8 by means of bearings 10, while numeral 11 indicates a second shaft which is concentrically disposed in the first hollow shaft 8 and has one end thereof fixedly secured to the hollow shaft 8 by means of, for example, a shrink fit and other end connected to the output shaft 9. Numeral 12 indicates a circular detecting disc which has at least one detecting element 13a such as a permanent magnet mounted on the periphery thereof. Numeral 14 indicates a circular detecting disc which is provided with at least one detecting element 13b in the same manner as that of the circular detecting ring 12. Numerals 15a and 15b indicate detectors which are designed such that they generate an output signal when the two detecting elements 13a and 13b come in alignment with respective detectors 15a and 15b. Numeral 16 indicates a base provided on the motor frame 2 and such base has a desired number of mounting apertures 17. Numeral 18 indicates a support stay which extends axially from the bracket 5 so as to support the two detectors 15a and 15b in place, while numeral 19 indicates a protective cover. L indicates a set-up size which is a distance between the center axis of the mounting aperture 17 and the extremity of the output shaft 9.

With the above construction, when the motor is driven, the rotating torque of the rotor 3 is transmitted to the output shaft 9 by way of the first shaft 8 and the second shaft 11. Since the first shaft 8 has sufficient bending rigidity against deflection caused by the unbalance of the rotor and the magnetic force and thereby also has sufficient torsional rigidity against torsion, when the load is applied to the output shaft 9, the second shaft 11 is twisted by a suitable twisting angle. Such twisting provides a time lag which is proportional to the above twisting angle between a detecting time where the detecting element 13a provided on the detecting disc 12 of the first shaft 8 comes in alignment with the detector 15a and a detecting time where the detecting element 13b provided on the detecting disc 14 of the output shaft 9 comes in alignment with the detector 15b. The transmission torque is finally measured by utilizing this time lag.

However, such conventional electric motor has the following defects.

(1) Since the second shaft 11 is an elongated bar having a small diameter to permit the twisting thereof, the shaft is easily influenced by the bending moment applied thereto. Therefore, when a considerable degree of bending moment is applied, the output shaft on which the detecting element is mounted is deflected considerably provided that there exists a clearance at the bearing portion disposed between the second shaft and the output shaft.

Accordingly, there is a good chance that an error will occur in the alignment of the detecting element with the detector, resulting in inaccurate torque measurement.

(2) Since the transmission torque is measured by the twisting angle of the second shaft 11, it becomes necessary to arrange at least the detecting element 13b and the detector 15b of the output shaft at the load (output) side. Therefore, such elements are subjected to the heat of the load side which adversely affects these detecting element. Furthermore, since the load side requires a considerable space, the set-up size L between the center-axis of the mounting aperture 17 of the base 16 to the extremity of the output shaft 9, becomes incompatible with the set-up sizes of standard electric motors. Therefore, in replacing such standard electric motors, a conventional motor provided with torque measuring means has to change or renew the mounting position relative to an apparatus which is to be operated by the motor.

(3) In the twisting route from the detecting element 13a of the first shaft 8 to the detecting element 13b of the output shaft 9 by way of the first shaft 8, the second shaft 11 and the output shaft 9, there exist so many mechanical junctions or connections which may cause errors in measuring the transmission torque. Therefore, high precision is required in manufacturing the related parts.

Accordingly, it is an object of the present invention to provide an electric motor which can resolve the aforementioned defects of conventional electric motors and which can allow the output shaft to have enough mechanical strength while assuring an accurate measuring of the transmission torque.

In summary, the present invention relates to an electric motor comprising a stator, a rotor disposed concentrically within the stator, a drive shaft rotatably supporting the rotor with a circular gap between the stator and the rotor and an output shaft connected to the drive shaft and sharing the same rotating axis with the drive shaft, wherein the improvement is characterized in that the electric motor further includes a resilient connecting member which connects the drive shaft and the output shaft and means which detects the torsion of the resilient connecting member produced during the transmission of the torque from the rotor to the output shaft and measures the transmission torque from the detected torsion.

DETAILED DESCRIPTION OF DISCLOSURE

The electric motor of the present invention is described in detail hereinafter in conjunction with attached drawings.

Figure 2:
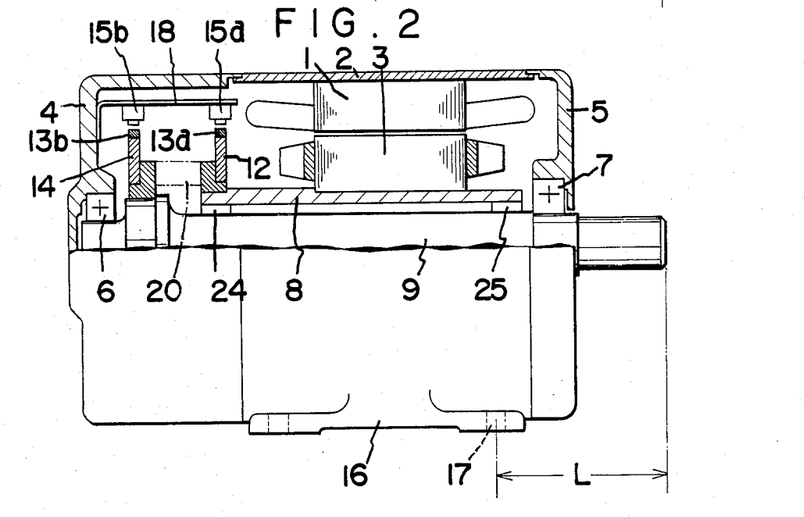
FIG. 2 is a side view with a part broken away of an electric motor of the present invention.

Such an electric motor is shown in FIG. 2. In the drawing, an output shaft 9 has both ends thereof rotatably supported by brackets 4 and 5 by means of bearings 6 and 7. A rotor 3 which is rotatable within a stator 1 with a suitable circular gap is fixedly mounted on a hollow drive shaft 8, which, in turn, is concentrically supported on the output shaft 9 by means of needle bearings 24 and 25. The drive shaft 8 and the output shaft 9 are connected by a resilient connecting member 20 at the non-load side of the motor.

Due to the above construction, when the motor is driven to transmit the rotating torque from the drive shaft 8 to the output shaft 9, the resilient connecting member 20 provides the twisting thereof, wherein the twisting angle is proportional to the transmission torque so that the transmission torque can be readily measured by detecting the twisting angle. In FIG. 2, like numerals are used to indicate like parts of the motor in FIG. 1.

Figure 3:
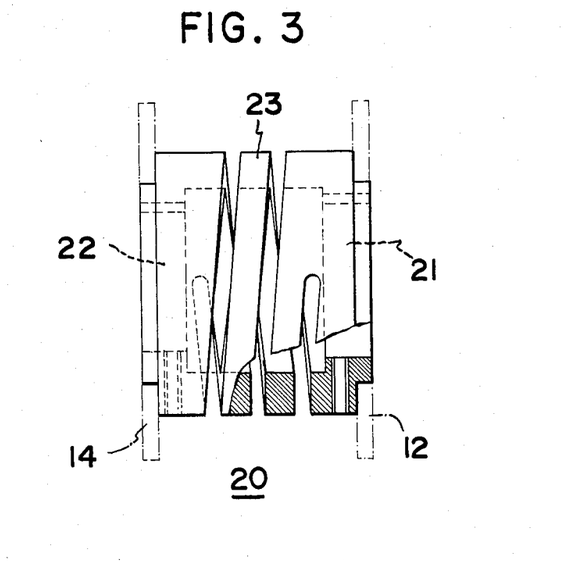
FIG. 3 is an enlarged side view with a part broken away of the resilient connecting member shown in FIG. 2.

The resilient connecting member 20, for example, as shown in FIG. 3, is made of spring steel and comprises a coil-shaped resilient portion 23 and a pair of attachment annular rings 21 and 22 which are integrally attached to the respective ends of the resilient portion 23. Such shape is provided by processing a spring steel tube by a machine cut. The drive shaft 8 is firmly connected to the annular ring 21, while the output shaft 9 is firmly connected to the annular ring 22. Circular detecting discs 12 and 14 are also firmly secured to end surfaces of the attachment annular rings 21 and 22 respectively which, in turn, are provided with detecting elements 13a and 13b on the respective peripheries thereof. In the above construction, the shafts 8 and 9 are firmly connected to the resilient connecting member 20 preferably by a shrink fit, keys or set screws.

The manner in which the electric motor having the above construction is operated is hereinafter disclosed.

When the motor is driven, the rotating torque of the rotor 3 is transmitted to the output shaft 9 by way of the drive shaft 8 and the resilient connecting member 20. In the above torque transmission, since the drive shaft 8 and the output shaft 9 have sufficient rigidity against the deflection caused by the unbalance of the rotor 3 and the magnetic force, and thereby also has a sufficient torsional rigidity against the torsion, the resilient connecting member 20 provides the twisting thereof when the load is applied to the output shaft 9. Therefore, a time lag which is proportional to the twisting angle is produced between a first detecting time where the detecting element 13a of the detecting disc 12 (the drive shaft 8) and the detector 15a come in alignment and a second detecting time where detecting element 13b of the detecting disc 14 (the output shaft 9) and the detector 15b come in alignment. The transmission torque can be measured by this detected time lag.

Namely, the twisting angle is obtained by following formula $$\theta = 2\pi \times N \times \Delta t$$

wherein
$\theta$: twisting angle (radian)
N: rotating speed (r.p.s.)
$\Delta t$: time lag (second),
while the transmission torque is obtained from the following formula, $$T = k\theta \times \theta$$

wherein
T: transmission torque (kg-mm)
$k\theta$: equivalent torsional stiffness (kg-mm/radian)

Several Embodiments are further sought for hereinafter as to the above-mentioned construction and the manner of operation.

First Embodiment (FIG. 4 to FIG. 10)

This embodiment substantially relates to an improvement of the resilient connecting members.

In the above construction described previously, the coil spring made of spring steel is substantially utilized as the resilient connecting member 20. However, when the motor is driven, the coil spring is subject to centrifugal force and such centrifugal force varies in proportion to the varying rotating speed of the coil spring. Since such centrifugal force provides a torsional displacement, the zero-point of the torque as an output in the torque measurement varies or provides an error.

Therefore, it becomes necessary to take a suitable measure to conduct a highly accurate or precise measurement of the torque irrespective of the variation of the rotating speed.

Figure 4:
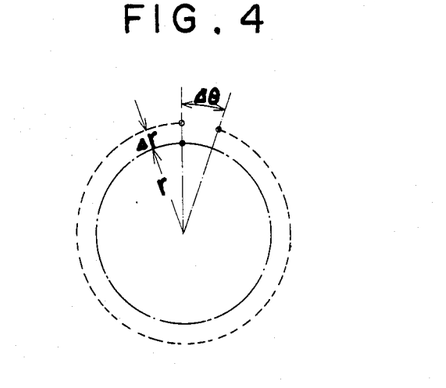
FIG. 4 is an explanatory view explaining the relationship between the torsion applied to the above resilient connecting member and the varying diameter of the same member.

The phenomenon in which the above error occurs is further explained in view of FIG. 2 to FIG. 4.

When the coil spring 20 is rotated on the center axis thereof, the wire of the coil spring receives the following centrifugal force F per unit length.

$$F = \rho S r \omega^2 \quad (1)$$

wherein
$\rho$: density of wire of coil spring (kg/m³)
S: cross sectional area of above wire (m²)
r: radius of coil (m)
$\omega$: angular velocity (rad/sec)

Due to the above centrifugal force, when the radius of the coil spring increases by $\alpha r$, the coil spring receives the following energy per a unit length of wire.

$$u = \tfrac{1}{2} \rho S r \omega^2 \Delta r \quad (2)$$

Assuming that the spring wire having the length of $2\pi r$ increases the radius thereof from (r) to $(r + \alpha r)$ and, as a result, the angle of the spring wire is varied from $(2\pi)$ to $(2\pi - \Delta\theta)$, the formula $2\pi r = (2\pi - \Delta\theta)(r + \alpha r)$ can be established since the length of the springs wire is constant. From the above formula, a formula $\Delta r \approx r\Delta\theta/2\pi$ is established. Furthermore, by introducing $\Delta\phi$ as a twisting angle per a unit length of wire, since $\Delta\phi = \Delta\theta/2\pi r$, the above formula is converted into $$\Delta r = r^2 \Delta\phi \quad (3)$$

From the formulae (2) and (3), following formula can be established.

$$u = \tfrac{1}{2}\rho S r^3 \omega^2 \Delta\phi \quad (4)$$

While, when the wire receives the bending by $\Delta\phi$, the energy accumulated in the wire is expressed by following formula.

$$u' = \tfrac{1}{2} E I \Delta\phi^2 \quad (5)$$

wherein
E: Young's modulus
I: second moment of area
Since both energies are equal, following formula can be established.

$$\Delta\phi = \rho S r^3 \omega^2 / E I \quad (6)$$

From this formula, the twisting angle $\Delta\theta$ per a single turn is expressed as follows.

$$\Delta\eta = 2\pi r^4 \rho S \omega^2 / E I \quad (7)$$

In this manner, when the transmission torque is to be measured using the coil spring as the resilient connecting member with a motor condition where the rotating speed varies, the zero-point of an torque meter varies or provides an error, since the coil per se is twisted by the centrifugal force.

For estimating the amount of $\Delta\theta$, physical data are put into the above formula (8), wherein $r = 35 \times 10^{-3}$ m, $h = 11 \times 10^{-3}$ m, $\rho = 7.8 \times 10^3$ kg/m², $E = 200 \times 10^9$ N/m², $\omega = 2\pi \times 30$ rad/sec (=1800 r.p.m.), and the obtained $\Delta\theta = 1.3 \times 10^{-3}$ rad (=0.074 degree).

Since the radial deformation of the coil spring is restricted at both ends thereof by junctions with the drive shaft and the output shaft, the actual twisting angle is considered to take a value lower than the above calculated value. However, assuming that the torsion of the coil spring per a single turn is about 1 degree, the velocity error in the above instance caused by centrifugal force accounts for several percent.

Figure 5:
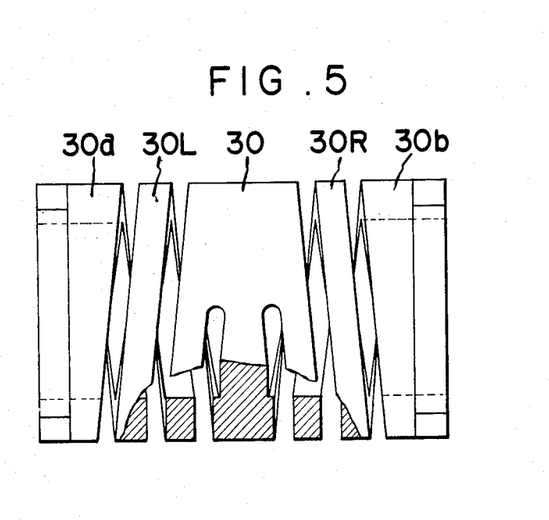
FIG. 5 is a side view with a part broken away of an improved type of resilient connecting member.

An improved coil spring shown in FIG. 5 is devised to eliminate such error in zero-point adjustment of the torque measuring device which is caused by the coil spring shown in FIG. 3. Such improved coil spring is substantially characterized in that the coil spring comprises two spiral portions which have the same number of turns and the same diameter but have the winding directions opposed to each other. Due to such constuction, even when the centrifugal forces are exerted on respective spiral portions, these forces offset each other so that the variation of the zero-point in the torque measuring operation can be eliminated.

To be more specific, in FIG. 5, a clockwise spiral portion 30R and a counter-clockwise spiral portion 30L have facing ends connected at the center of the coil spring 30 and opposed ends secured to the drive shaft and the output shaft respectively.

Figure 6:
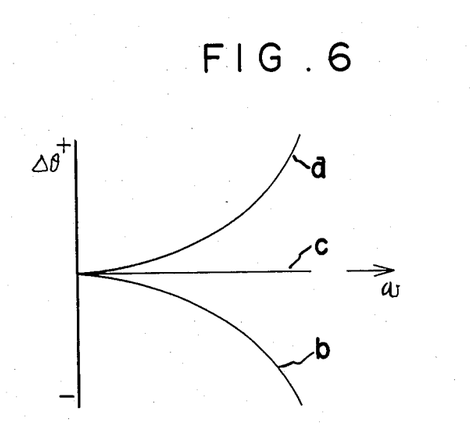
FIG. 6 is a graph showing the relationship between the rotating speed and the twisting angle of the above resilient connecting member.

Due to such construction, when the centrifugal force is applied to the coil spring, the clockwise spiral portion 30R and the counter-clockwise portion 30L loosen in directions opposed to each other so that the coil spring 30, as a whole, can eliminate the influence of the centrifugal force. FIG. 6 shows the above relationship between two spiral portions, wherein the twisting angle $\Delta\theta$ is taken on the coordinate and the angular velocity of the motor is taken on the abscissa.

In FIG. 6, a curve "a" indicates the twisting angle of the clockwise spiral portion 30R, a curve "b" indicates the twisting angle of the counter-clockwise spiral portion 30L and a straight line "c" indicates the combined twisting angle.

Figure 7:
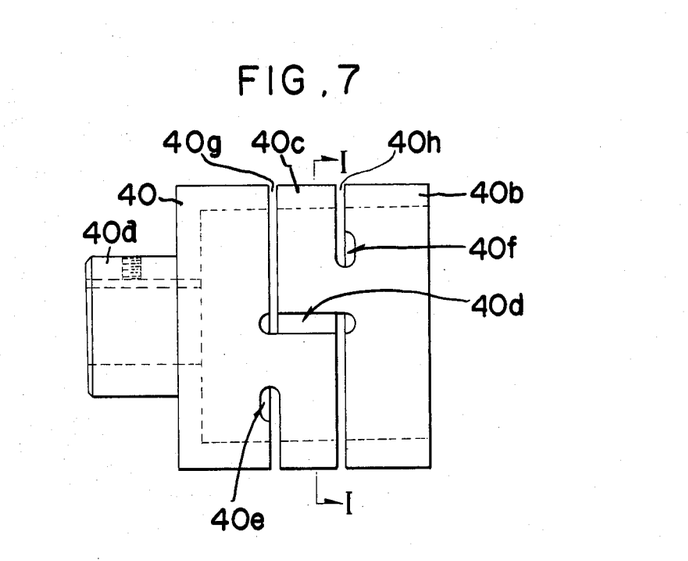
FIG. 7 is a side view of another improved type of resilient connecting member.
Figure 8:
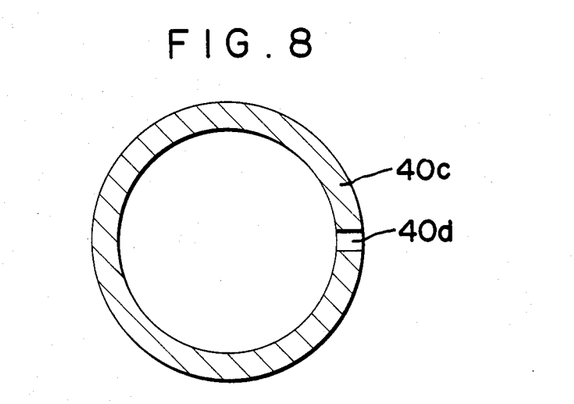
FIG. 8 is a transverse cross sectional view of the resilient connecting member taken along the line I—I of FIG. 7.
Figure 9:
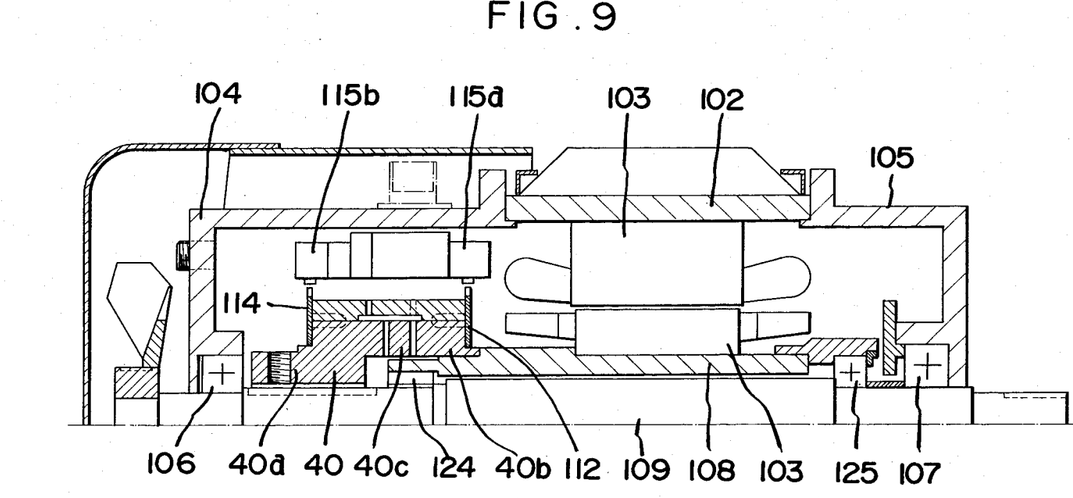
FIG. 9 is a longitudinal cross sectional view of an electric (induction) motor which encases the above resilient connecting member.

Another improved resilient connecting member is shown in FIG. 7 to FIG. 9.

With respect to above mentioned coil springs (FIG. 3 and FIG. 5), since the resilient portion is formed in a spiral shape, the manufacturing including the machining thereof is considered relatively difficult. Furthermore, it is also considered that since the groove formed between each two spiralling band portions has the same width as that of the band portions, the coil spring as a whole becomes large-sized. This implies that the torque detecting portion occupies a considerable space in the motor. Furthermore, as a mechanical problem, which is an inherent characteristic of the spiral-shaped coil spring, since the resilient portion has a pitch (helix) angle, the distance between the two connecting end portions is considerably elongated so that the bending moments which work on the coil-mounting shafts; namely, the output shaft and the drive shaft due to the twisting of the coil spring also becomes a considerable amount. (When the spirally-shaped resilient portion is twisted, a stress which works to make the axes of the shaft-connecting ends of the coil spring not be in alignment with each other is exerted, and such stress produces a bending moment which bends the spring-mounting shafts along the longitudinal axes.) Due to such bending moment, the detecting discs attached to the respective ends of the coil spring for detecting the twisting angle between such spring ends are dislocated or shifted from the detectors (pick-ups) disposed adjacent to the detecting discs so that detecting accuracy is deteriorated. In addition, the weight applied to the bearings (especially driveside bearing) become unbalanced relative to the axis, whereby the bearings are damaged, thus shortening the life thereof.

The coil spring shown in FIG. 7 to FIG. 9 is characterized in that (i) the resilient portion of the coil spring has no pitch angle, whereby the above-mentioned various problems concerned with manufacturing, machining or the space which the coil spring occupies in the motor can be resolved, (ii) since the bending moment applied to the shafts can be minimized, the detecting accuracy is improved and the life of the bearings is prolonged.

Such coil spring comprises an output-shaft-mounting portion 40a, a drive-shaft mounting portion 40b and a resilient portion 40c defined between such mounting portions 40a and 40b, wherein the resilient portion 40c is formed as a C-shaped ring having no pitch angle. The machining of such resilient portion is conducted such that, an elongated longitudinal opening 40d is formed in the wall of a cup-shaped body, a pair of opposed apertures 40e and 40f are formed in the wall at positions above one end of the elongated opening and below the other end of the elongated opening respectively, and a pair of parallel-spaced-apart circular grooves 40g and 40h which are perpendicular to the axis of the cup-shaped body are formed in the wall so as to communicate the apertures 40g, 40h with the corresponding ends of the elongated longitudinal opening.

In FIG. 9, an induction motor provided with the above-mentioned coil spring is shown.

Figure 10:
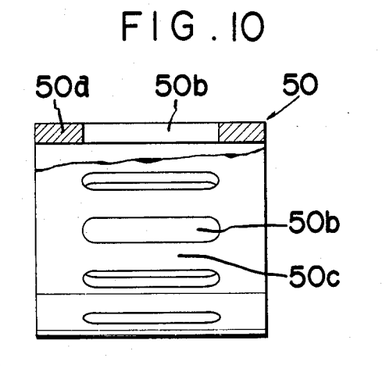
FIG. 10 is a side view with a part broken away of still another improved type of resilient connecting member.

The resilient connecting member also can have an improved construction as shown in FIG. 10, wherein a circular cylindrical body 50a made of spring steel has a plurality of parallel-equi-distant longitudinal openings 50b formed in the circumferential wall thereof with the exception of both portions thereof either by machining or pressing. Such construction provides a plurality of resilient connecting portions 50c at the midst thereof. Both ends of the cylindrical body are connected with the drive shaft and the output shaft respectively.

Second Embodiment

This embodiment substantially relates to improvements on the output shaft, the drive shaft and detecting discs.

Although not shown in the drawing, the drive shaft and the output shaft may be provided with flange portions (either integrally with or separately from the shafts) and these flange portions may be connected by a suitable connecting means such as a leaf spring, a torsion spring, a rubber spring, or a composite spring.

It must be also stated that the connection between the drive shaft and the output shaft does not necessarily need to be conducted at the non-load-side of the motor and the connection may be effected at the load-side. In this case, the drive shaft can be a solid shaft and can be connected with the output shaft coaxially.

Furthermore, although the detecting discs are arranged in an axial direction, these discs may be concentrically arranged such that the detecting elements face to the detectors in an axial direction.

Figure 11:
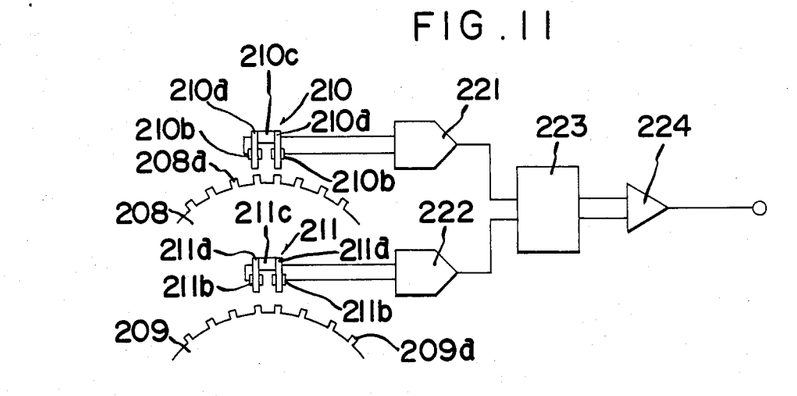
FIG. 11 is a block diagram showing the sequence of a torque measuring device.
Figure 12:
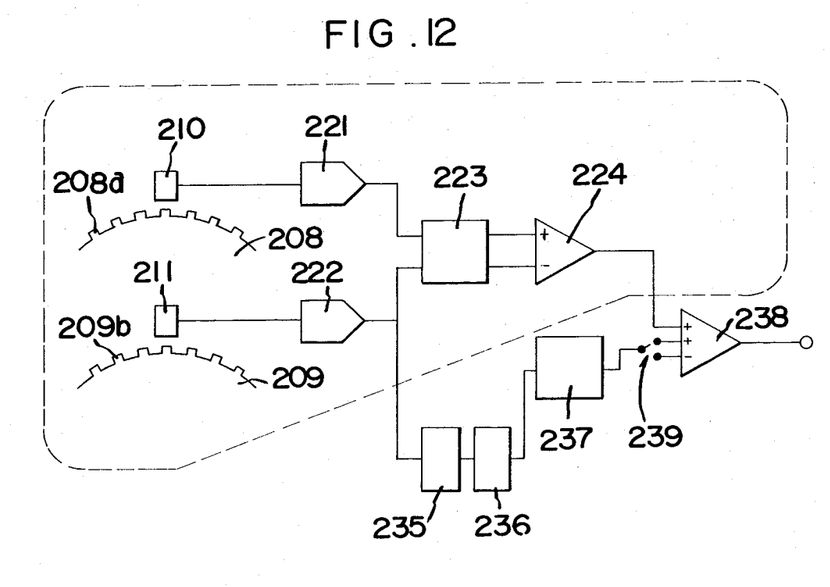
FIG. 12 is a block diagram showing the sequence of another torque measuring device.

Third Embodiments (FIG. 11 and FIG. 12)

This embodiment relates to preferred torque measuring devices. One of such devices is shown in FIG. 11 as a block diagram.

In the drawing, detecting elements 210 and 211 comprise a pair of yokes 210a and 211a, coils 210b, 211b wound around the yokes for detecting the change of magnetic flux and magnets 210c and 211c which define magnet circuits between the yokes and the detecting discs. The yokes 210a and 211a comprises a pair of parallel-spaced-apart magnetic members which are disposed adjacent to the protrusions 208a and 209a provided on the outer peripheries of the first and second detecting discs 208 and 209 and the space between the magnetic members is determined equal to the pitches of such protrusions 208a and 209a. Accordingly, when the motor is driven and the drive shaft is rotated, the sinusoidal waves, the frequencies of which is proportional to the rotations of the first and second detecting discs 208 are produced from the first and second detectors 210 and 211 as outputs respectively and these sinusoidal waves are transmitted to wave rectifying circuits 221 and 222 and are rectified into rectangular waves therein. Such rectified waves then are transmitted into a time lag detecting circuit 223 as inputs and an output which is proportional to the phase difference between two rectangular wave forms is produced from the circuit 223. Namely, when the load torque increases, the rotational phase of the second detecting disc 209 is delayed from the corresponding value of the first detecting disc 208 due to the twisting of the spring (e.g. 20 of FIG. 2), while in a reduced speed condition, due to the moment of inertia on the load-side, the rotational phase of the second disc 209 goes ahead of the corresponding value of the first detecting disc 208. An electric signal which is proportional to the above time difference of phase is produced from the above time difference detecting circuit 223 as an output, wherein such output is either positive or negative. Then, the output is amplified in an amplifying device 224. By choosing a desired amplitude, the output which is now converted into the value of torque is obtained.

Although the coil spring shown in FIG. 3 suffers an error in twisting angle due to the centrifugal force as mentioned above, the torque value including such error can be compensated by utilizing a torque measuring device which has the construction as shown in FIG. 12. Namely, the torque measuring device shown in FIG. 12 is provided with a compensating circuit in addition to the construction shown in FIG. 11 and such compensating circuit compensates the torque output in the following manner. Namely, the rectangular wave which is obtained by the wave rectifying circuit 232 (or 231) and has the frequency which is proportional to the rotation of the detecting disc 212 is transmitted to a mono-stable multivibrator 235 and the output pulse from the vibrator 235 is transmitted into a smoothing circuit 236 as an input, thus obtaining a direct current voltage. This output is transmitted into a compensating value set circuit 237 as an input to provide the compensating value of the formula (7). Although the compensating value is proportional to the square value of velocity (rotation), such compensating value may be proportional to the linear value of the velocity. This compensating value is fed into a subtracting circuit 238 as an input along with the output from the amplifier 224 and true torque value is obtained from this subtracting circuit 238 as an output. In the drawing, numeral 239 indicates a circuit changing switch which works in such a manner that when the winding direction of the coil springs (seen from the drive shaft) is the same as that of the rotational direction, such switch is thrown to effect subtracting compensation, while the winding direction of the coil spring is reverse to the rotational direction, the switch is thrown to effect the adding compensation. The operation of this circuit changing switch 239 is automatically conducted by detecting the rotating direction of the rotating body.

Figure 13:
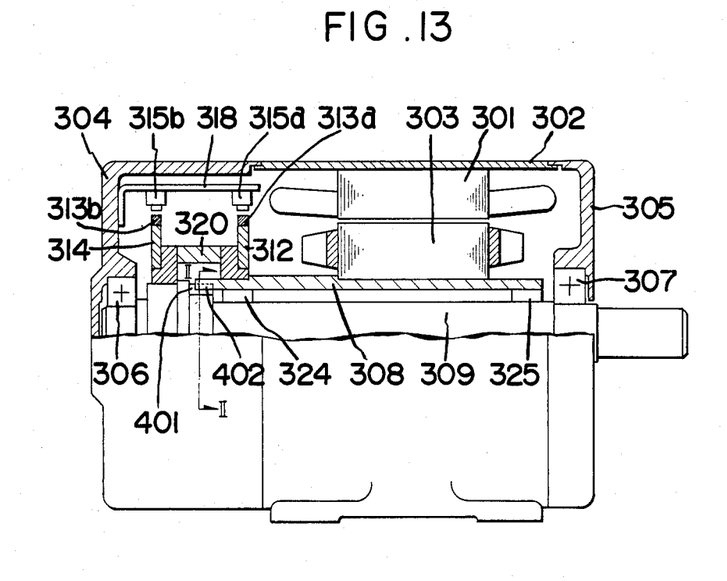
FIG. 13 is a side view with a part broken away of a modification of the electric motor of the present invention.
Figure 14:
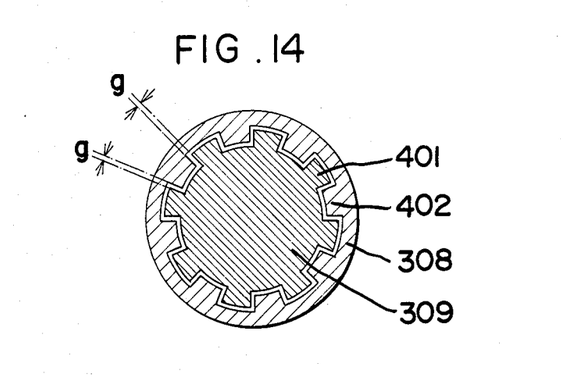
FIG. 14 is a transverse cross sectional view of the electric motor taken along the line II—II of FIG. 13.

Fourth Embodiment (FIG. 13 and FIG. 14)

This embodiment relates to an electric motor which is further provided with means to protect the resilient connecting member from rupture.

With respect to the electric motors which are described heretofore, when the motor is about to be driven or at the time of starting or when the load is suddenly locked or when the load suddenly becomes excessive due to any causes such as the failure of ignition of the inverter for the variable frequency power source, an excessive torque which is ten times greater than the rated motor torque occurs within the motor. Such excessive torque results in damage of the resilient connecting member, thus making the measuring of the torque impossible or dislocating the connecting positions between the resilient member and the shafts, thus producing an error in the measured torque value.

The motor of this embodiment is devised to prevent such accident and such motor is explained in view of drawings FIG. 13 and FIG. 14.

Since the basic construction or the structure is almost the same as that of the motors described heretofore, such construction is not referred to in this embodiment, and only the means which protects the resilient connecting member is described in detail. In the drawings, numeral 401 indicates a plurality of equidistant engaging members provided on the circumference of the output shaft 309, and such engaging members may be a plurality of radially protruding outer teeth fixedly mounted on the circumference of the shaft. Numeral 402 indicates a plurality of another engaging member mounted on the drive shaft 308, and in the drawing, such engaging members may be a plurality of teeth which are mounted on the inner surface of the drive shaft 308. The above engaging members 401 mesh with the corresponding engaging members 402 in such a manner that a pair of suitable circumferential gaps g are formed therebetween.

When the motor is driven, the rotational torque of the rotor 303 is transmitted to the shaft 309 by way of the risilient connecting member 320. In the above transmission of the torque, since the drive shaft 308 has a sufficient rigidity against the deflection or distortion caused by the unbalance of the stator or the magnetic force and thereby also has a sufficient torsional rigidity against the torsion, the resilient member 320 is twisted when the load is applied to the output shaft 309. Therefore, the time lag which is proportional to the above twisting angle is produced between the detecting time where the detecting element 313a of the drive-shaft-side detecting disc comes in alignment with the detector 315a and the detecting time where the detecting element 313b comes in alignment with the detector 315b. Making use of this time lag, the torque can be measured.

However, in the above torque detecting or torque measurement, when an excessive torque is applied to the resilient connecting member 320, thus making the twisting amount of the resilient connecting member 320 become greater than the gap g, the engaging members 401 of the output shaft 309 come into contact with the engaging members 402 of the drive shaft 308 so that the torque of the drive shaft 308 is directly transmitted to the output shaft 309 by means of the above engagement of the engaging members 401 and 402 without the intermediary of the resilient connecting member 320. Therefore, no twisting which exceeds the above gap g occurs.

The engaging members 401 and 402 do not need to be limited to a tooth-shape which protrude in a radial direction. Namely, such engaging members may be protruded in an axial direction and may take any suitable shapes. Furthermore, they can be either directly mounted on the shaft or indirectly mounted on the shafts as separate parts, possibly with the resilient connecting member.

Although in the drawing, the drive shaft has a hollow tubular construction, the drive shaft and the output shaft may be arranged coaxially such that their corresponding ends facing to each other.

Furthermore, the above embodiment is applicable not only to an electric motor which measures the transmission torque by detecting the twising angle but also to an electric motor which measures the transmission torque by utilizing the strain of the resilient connecting member, wherein a strain gauge is adhered to the resilient connecting member, a slip ring or a rotary transformer which is electrically connected with the strain gauge is mounted also on the resilient connecting member so as to pick up the detecting output and finally, the transmission torque is measured by the amount of the detected strain caused by the twisting of the resilient connecting member.

In this manner, according to this embodiment, the drive shaft and the output shaft have their engaging members engaged with each other when the twisting angle of the resilient connecting member becomes greater than the above mentioned gaps g. Due to the above engagement of both engaging members, the torque of the drive shaft is directly transmitted to the output shaft. Therefore, even when an excessive torque is applied to the output shaft by a chance or an accident, no damage occurs on the resilient connecting member and no dislocation of the shaft connecting positions occurs so that an accurate torque measuring is constantly conducted throughout the running of the motor.

As has been described heretofore, the electric motor according to the present invention, has the following advantages.

(1) The drive shaft and the output shaft are connected by the resilient connecting member of a short length. This implies that an additional shaft for producing the twisting thereof becomes unnecessary so that the output shaft can have a sufficient diameter, thereby can assure a sufficient strength against any bending moment, whereby the output shaft will not impart any adverse effects on the measurement of the transmission torque.

(2) Since the transmission torque is measured by utilizing the twisting of the resilient connecting member which connects the drive shaft and the output shaft, the torque detecting means can be disposed at the non-load side of the motor which is away from the load, whereby the output shaft suffers no bending stress caused by the heat on the load side or the load per se. Accordingly, the accuracy of the measurement is greatly enhanced. Furthermore, since the motor according to this invention requires no space at the load side, the set-up size from the center axis of the base mounting hole to the end of the output shaft can be compatible to the corresponding size of the commercially available standard motors so that the motor of the present invention can readily replace the standard motors which were previously installed without altering the installing or mounting position of the apparatus which is driven by the motor.

(3) Since the drive-shaft-side detecting element and the output-shaft-side detecting element can be directly connected to the respective ends of the resilient connecting member, mechanical connections or junctions which becomes the causes of error in torque measurement can be reduced as small as possible in number so that the accuracy of the measurement is greatly enhanced. Furthermore, no precision is required in manufacturing of the motor parts with the exception of the twisting angle detecting portion so that the motor can be manufactured at low cost.

(4) In case the torque detecting coil spring is constructed by connecting the clockwise winding coil spring and the counter-clockwise winding spring, the variation of the zero-point in torque measurement which is caused by the centrifugal force of the rotating body can be eliminated so that the transmission torque can be measured with high accuracy.

(5) In case the coil spring is constructed such that the C-shaped ring with no pitch angle is utilized to form the resilient portion thereof, such coil spring can have following the advantages.

(a) Since the pitch angle is zero, the interval between the ends of the coil spring can be shortened so that the space within the motor is fully utilized.

(b) Since the pitch angle is zero, the interval between the ends of the coil spring can be shortened so that the bending moment which applies to the shafts can be reduced as small as possible, whereby the dislocation of the detecting elements on the detecting discs can be minimized, thus providing enhancement of the accuracy in torque measurement.

(c) Since the bending moment can be minimized, the weight can be uniformly applied to the bearings so that the life of the bearings is prolonged.

(d) Since the pitch angle is zero, the manufacturing including the machining of the coil spring becomes extremely easy compared with spiral-shaped coil springs.

(6) Even when the spiral-shaped coil spring (or the C-shaped coil spring) is utilized, the electric motor has means to compensate the error produced by the centrifugal force applied to the resilient connecting member during the rotation thereof so that the transmission torque can be accurately measured.

(7) The electric motor of this invention can be provided with engaging members on the drive shaft and the output shaft respectively such that both engaging members engage with each other with suitable circumferential gaps. Due to such construction, when the twisting angle of the resilient connecting member exceeds the gap, the torque of the drive shaft is directly transmitted to the output shaft by the above engagement of the engaging members. Accordingly, even when an excessive torque is applied to the resilient connecting member, no damage occurs on the resilient connecting member and no dislocation of the shaft mounting portions occurs, whereby the transmission torque can be accurately measured throughout the running of the motor.

What we claim is:

1. An electric motor comprising:
   (a) a stator fixedly mounted on a motor casing,
   (b) a rotor concentrically disposed in said stator,
   (c) a hollow tubular drive shaft fixedly mounting said rotor thereon for rotating said rotor relative to said stator with a suitable circular gap between said stator and said rotor,
   (d) an output shaft passing thru said hollow tubulur drive shaft said output shaft sharing the same rotating axis with said drive shaft,
   (e) a resilient connecting member disposed at the non-load side of said motor and connecting said drive shaft and said output shaft for transmitting torque from said drive shaft to said output shaft and
   (f) means for measuring the transmission torque by detecting the twisting amount of said resilient connecting member produced during transmission of said torque from said drive shaft to said output shaft.

2. An electric motor comprising:
   (a) a stator fixedly mounted on a motor casing,
   (b) a rotor concentrically disposed in said stator,
   (c) a drive shaft fixedly mounting said rotor thereon for rotating said rotor relative to said stator with a suitable circular gap between said stator and said rotor,
   (d) an output shaft rotatably disposed in said motor, said output shaft sharing the same rotating axis with said drive shaft,
   (e) a resilient connecting member disposed in said motor and connecting said drive shaft and said output shaft,
   (f) means for measuring the transmission torque by detecting the twisting amount of said resilient connecting member produced during transmission of said torque from said drive shaft to said output shaft, and
   (g) a desired number of first and second engaging members provided on said drive shaft and said output shaft respectively with both of said engaging members engaging each other with suitable circumferential gaps therebetween, said circumferential gap being smaller than the allowable twisting angle of said resilient connecting member, but greater than the twisting angle of said resilient connecting member at normal running of said motor.

3. An electric motor comprising:
   (a) a stator fixedly mounted on a motor casing,
   (b) a rotor concentrically disposed in said stator,
   (c) a driven shaft fixedly mounting said rotor thereon for rotating said rotor relative to said stator with a suitable circular gap between said stator and said rotor,
   (d) an output shaft rotatably disposed in said motor, said output shaft sharing the same rotating axis with said drive shaft,
   (e) a resilient connecting member disposed in said motor and connecting said drive shaft and said output shaft, said resilient connecting member comprising two end portions where said output shaft and said drive shaft are connected and an intermediate resilient portion which is made of a C-shaped resilient ring having a zero pitch angle, and
   (f) means for measuring the transmission torque by detecting the twisting amount of said resilient connecting member produced during transmission of said torque from said drive shaft to said output shaft, said transmission-torque-measuring means including a pair of detecting elements which are rotatable along with said drive shaft and said output shaft, respectively, and a pair of detectors which detect the rotating angles of said respective detecting elements and said detectors transmit outputs when said detecting elements come into alignment with said respective detectors, whereby said twisting amount in the form of the twisting angle of said resilient connecting member is detected as either a time lag or a phase difference between said detected output of said detectors and said transmission torque is measured by said detected twisting angle.

4. An electric motor according to claim 1, wherein said torque measuring means comprises means for detecting the strain of said resilient connecting member which is caused by said twisting thereof and means for measuring said transmission torque from said detected strain.

5. An electric motor according to claim 1, wherein said resilient connecting member is a coil spring comprising a desired number of turns in the same winding direction.

6. An electric motor comprising:

(a) a stator fixedly mounted on a motor casing,
(b) a rotor concentrically disposed in said stator;
(c) a drive shaft fixedly mounting said rotor thereon for rotating said rotor relative to said stator with a suitable circular gap between said stator and said rotor;
(d) an output shaft rotatably disposed in said motor, said output shaft sharing the same rotating axis with said drive shaft,
(e) a resilient connecting member disposed in said motor and connecting said drive shaft and said output shaft, said resilient connecting member comprising two end portions where said output shaft and said drive shaft are connected and an intermediate resilient portion which is made of a C-shaped resilient ring having a zero pitch angle, and
(f) means for measuring the transmission torque by detecting the twisting amount of said resilient connecting member produced during transmission of said torque from said drive shaft to said output shaft.

7. An electric motor according to claim 6, wherein said torque measuring means includes means which detects the rotating speed of said output shaft means for compensating and said measured torque value in proportion to the square value of said rotating speed.

8. An electric motor according to claim 6, wherein said torque measuring means includes means which detects the rotating speed of said output shaft and said measured torque value is compensated in proportion to the approximately linear value of said rotating speed.

9. An electric motor according to claim 1, wherein said resilient connecting member is constructed by connecting a clockwise-winding coil spring and a counterclockwise-winding coil spring, both of which have same turns and same coil diameter.

10. An electric motor according to claim 1, wherein said resilient connecting member is provided with shaft-mounting rings at both ends thereof to which said drive shaft and said output shaft are connected respectively.

11. An electric motor according to claim 6, or 8, wherein said resilient connecting member is defined by machining a spring steel body.

12. An electric motor according to claim 1, wherein said drive shaft and said output shaft are provided with a desired number of first and second engaging members respectively and both of said engaging members engage with each other with suitable circumferential gaps therebetween.

13. An electric motor according to claim 11, wherein said first and second engaging members are fixedly mounted on shaft-mounting portions provided at both ends of said resilient connecting member such that said first and second engaging members radially face each other with suitable circumferential gaps.

14. An electric motor comprising:
(a) a stator fixedly mounted on a motor casing,
(b) a rotor concentrically disposed in said stator,
(c) a drive shaft fixedly mounting said rotor thereon for rotating said rotor relative to said stator with a suitable circular gap between said stator and said rotor,
(d) an output shaft rotatably disposed in said motor, said output shaft sharing the same rotating axis with said drive shaft,
(e) a resilient connecting member disposed in said motor and connecting said drive shaft and said output shaft, and
(f) means for measuring the transmission torque by detecting the twisting amount of said resilient connecting member produced during transmission of said torque from said drive shaft to said output shaft, said transmission-torque-measuring means including a pair of detecting elements which are rotatable along with said drive shaft and said output shaft respectively, and a pair of detectors which detect the rotating angles of said respective detecting elements and said detectors transmit outputs when said detecting elements come into alignment with said respective detectors, whereby said twisting amount in the form of the twisting angle of said resilient connecting member is detected as either a time lag or a phase difference between said detected outputs of said detectors and said transmission torque is measured by said detected twisting angle.

15. An electric motor comprising
(a) a stator fixedly mounted on a motor casing,
(b) a rotor concentrically disposed in said stator,
(c) a drive shaft fixedly mounting said rotor thereon for rotating said rotor relative to said stator with a suitable circular gap between said stator and said rotor,
(d) an output shaft rotatably disposed in said motor, said output shaft sharing a same rotating axis with said drive shaft,
(e) a resilient connecting member disposed in said motor and connecting said drive shaft and said output shaft, said resilient connecting member comprising two end portions where said output shaft and said drive shaft are connected and an intermediate resilient portion which is made of a C-shaped resilient ring having a zero pitch angle and,
(f) means for measuring the transmission torque by detecting the twisting amount of said resilient connecting member produced during transmission of said torque from said drive shaft to said output shaft.

16. An electric motor according to claim 15, wherein said drive shaft is made of a hollow tubular shaft which permits said output shaft to pass therethrough concentrically, and said resilient connecting member is disposed at a non-load side of said motor.

17. An electric motor comprising:
(a) a stator fixedly mounted on a motor casing,
(b) a rotor concentrically disposed in said stator,
(c) a drive shaft fixedly mounting said rotor thereon for rotating said rotor relative to said stator with a suitable circular gap between said stator and said rotor,
(d) an output shaft rotatably disposed in said motor, said output shaft sharing the same rotating axis with said drive shaft,
(e) a resilient connecting member disposed in said motor and connecting said drive shaft and said output shaft, said resilient connecting member comprising two end portions where said output shaft and said drive shaft are connected and an intermediate resilient portion which is made of a C-shaped resilient ring having a zero pitch angle and, (f) means for measuring the transmission torque by detecting the twisting amount of said resilient connecting member produced during transmission of said torque from said drive shaft to said output shaft, and (g) a desired number of first and second engaging members provided on said drive shaft and output shaft respectively and both of said engaging members engage each other with suitable circumferential gaps therebetween, said circumferential gap being smaller than the allowable twisting angle of said resilient connecting member, but greater than the twisting angle of said resilient connecting member at normal running of said motor.

18. An electric motor according to claim 15, wherein said torque-measuring means comprises means for detecting the strain of said resilient connecting member which is caused by said twisting thereof and means for measuring said transmission torque from said detected strain.

19. An electric motor according to claim 15, wherein said torque measuring means includes means which detects the rotating speed of said output shaft means for compensating and said measured torque value in proportion to the square value of said rotating speed.

20. An electric motor according to claim 15, wherein said torque measuring means includes means which detects the rotating speed of said output shaft and means for compensating said measured torque value in proportion to the approximately linear value of said rotating speed.

21. An electric motor according to claim 15, wherein said resilient connecting member is provided with shaft-mounting rings at both ends thereof to which said drive shaft and said output shaft are connected respectively.

22. An electric motor according to claim 15, wherein said resilient connecting member is defined by machining a spring steel body.

23. An electric motor according to claim 15, wherein said drive shaft and said output shaft are provided with a desired number of first and second engaging members respectively and both of said engaging members engage with each other with suitable circumferential gaps therebetween.

24. An electric motor according to claim 23, wherein said first and second engaging members are fixedly mounted on shaft-mounting portions provided at both ends of said resilient connecting member such that said first and second engaging members radially face each other with suitable circumferential gaps.

25. An electric motor according to claim 6 or 8, wherein said resilient connecting member is provided with shaft-mounting rings at both ends thereof to which said drive shaft and said output shaft are connected respectively.

* * * * *